UNITED STATES PATENT OFFICE.

JOHANNES JANSEN AND WILHELM NEELMEIER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

AZO DYE.

933,842.   Specification of Letters Patent.   Patented Sept. 14, 1909.

No Drawing.   Application filed February 3, 1909.   Serial No. 475,817.

*To all whom it may concern:*

Be it known that we, JOHANNES JANSEN and WILHELM NEELMEIER, doctors of philosophy, chemists, citizens of the German Empire, residing at Leverkusen, near Cologne, Germany, have invented new and useful Improvements in New Azo Dyes, of which the following is a specification.

Our invention relates to the manufacture and production of new coloring matters capable of dyeing on a mordant.

The new dyestuffs are obtained by combining the diazo compounds of such ortho-aminophenol derivatives which contain either nitro-groups or halogens or both nitro-groups and halogens but no sulfonic or carboxylic groups with beta-beta-dioxy-naphthalenes *e. g.* 2.3- or 2.6 - dioxynaphthalene.

The new products possess the valuable property that they can be dyed on wool together with bichromate in the same bath. They can also be dyed on a chrome mordant or according to the after-chroming method.
The dyeing in one bath is best done by adding the dye with the bichromate to the bath, entering the wool, boiling, adding acetic acid in small portions and boiling again. In this way fast black shades are obtained.

The new dyestuffs are dark powders soluble in water generally with a violet to blue to bluish-black color, and soluble in concentrated sulfuric acid generally with a violet color. They yield upon reduction with stannous chlorid and hydrochloric acid aminophenol derivatives and alpha - amino - beta-beta-dioxynaphthalenes.

In carrying out our new process practically we can proceed as follows, the parts being by weight:

Example:—15.4 parts of 4-nitro-2-aminophenol are diazotized in the usual manner by means of hydrochloric acid and 7 parts of sodium nitrite. The diazo compound is then added to an aqueous solution, which has to be stirred, until the combination is finished, of 16 parts of 2.6-dioxynaphthalene in the calculated quantity of NaOH and containing 200 parts of sodium carbonate.
The dyestuff precipitates by acidulation. It is filtered off, pressed and dried. It is a dark powder which is soluble in water with a blue and which is soluble in concentrated sulfuric acid with a violet color. By reduction with stannous chlorid and hydrochloric acid 2.4 - diaminophenol and 1 - amino - 2.6-dioxynaphthalene are obtained. It dyes wool according to the above described method black shades of good fastness to fulling and to light.

The process is carried out in an analogous manner on starting from 2.3-dioxynaphthalene. Other ortho-aminophenol derivatives may be used, such as 4-chloro-2-aminophenol, 4.6-dichloro-2-aminophenol, 5-nitro-2-aminophenol, picramic acid, 6-chloro-4-nitro-2-aminophenol, 6 - nitro - 4 - chloro - 2 - aminophenol, 6-methyl-4-nitro-2-aminophenol, 4-methyl-6-nitro-2-aminophenol, 2.4-dinitro-3-methyl - 6 - aminophenol, 5-nitro-4-chloro-2- aminophenol etc.

Having now described our invention and in what manner the same is to be performed, what we claim as new and desire to secure by Letters Patent is:—

1. The herein-described azo dyes derived from dioxynaphthalene having the formula above given combined with ortho amino phenol derivatives that have no sulfonic or carboxylic groups but contain nitro groups or halogens, and which dyes are after being dried and pulverized, dark powders soluble in water generally with a violet to blue to blue-black color, soluble in concentrated sulfuric acid generally with a violet color; yielding upon reduction with stannous chlorid and hydrochloric acid ortho-amino-phenol derivatives and alpha-amino-beta-beta-dioxynaphthalenes; and dyeing wool together with bichromate and acid in the same bath black shades, substantially as described.

2. The herein-described new azo dyestuff obtainable from 4-nitro-2-aminophenol and 2.6-dioxynaphthalene, which dyestuff is, after being dried and pulverized, a dark powder soluble in water with a blue color and soluble in concentrated sulfuric acid with a violet color; yielding upon reduction with stannous chlorid and hydrochloric acid 2.4-diaminophenol and 1-amino-2.6-dioxynaphthalene; and dyeing wool together with bichromate and acid in the same bath black shades fast to fulling and to light, substantially as described.

In testimony whereof we have hereunto set our hands in the presence of two subscribing witnesses.

JOHANNES JANSEN. [L. S.]
WILHELM NEELMEIER. [L. S.]

Witnesses:
OTTO KÖNIG,
WM. WASHINGTON BRUNSWICK.